United States Patent
Li

(10) Patent No.: US 11,248,646 B2
(45) Date of Patent: Feb. 15, 2022

(54) FASTENER

(71) Applicant: Yongbiao Li, Guangzhou (CN)

(72) Inventor: Yongbiao Li, Guangzhou (CN)

( * ) Notice: Subject to any disclaimer, the term of this patent is extended or adjusted under 35 U.S.C. 154(b) by 83 days.

(21) Appl. No.: 16/935,336

(22) Filed: Jul. 22, 2020

(65) Prior Publication Data

US 2020/0347872 A1 Nov. 5, 2020

Related U.S. Application Data

(63) Continuation-in-part of application No. PCT/CN2019/000015, filed on Jan. 23, 2019.

(30) Foreign Application Priority Data

Jan. 25, 2018 (CN) .......................... 201810108755.1

(51) Int. Cl.
*F16B 37/08* (2006.01)
*F16B 39/02* (2006.01)
*F16B 21/16* (2006.01)
*F16B 13/04* (2006.01)
*F16B 13/10* (2006.01)
*F16B 5/06* (2006.01)

(52) U.S. Cl.
CPC .......... *F16B 37/0892* (2013.01); *F16B 39/02* (2013.01)

(58) Field of Classification Search
CPC ...... F16B 21/16; F16B 39/02; F16B 37/0892; F16B 13/04; F16B 13/10; F16B 5/0642
See application file for complete search history.

(56) References Cited

U.S. PATENT DOCUMENTS

| 3,030,997 | A | * | 4/1962 | Collins | F16B 33/006 411/301 |
| 4,704,058 | A | * | 11/1987 | Crunwell | F16B 39/24 411/134 |
| 8,087,685 | B2 | * | 1/2012 | Weidner | B62K 21/06 280/279 |
| 10,502,255 | B2 | * | 12/2019 | Yvain | F16B 31/028 |
| 2018/0135687 | A1 | * | 5/2018 | Yvain | F16B 43/00 |

FOREIGN PATENT DOCUMENTS

| CN | 86100412 A | | 7/1987 | |
| CN | 208057635 | * | 11/2018 | |
| CN | 208057635 U | | 11/2018 | |
| DE | 102013100647 | * | 7/2014 | .......... E04F 13/0835 |
| DE | 102013100647 A1 | | 7/2014 | |

OTHER PUBLICATIONS

Internation Search Report of PCT/CN2019/000015, dated Apr. 29, 2019.

* cited by examiner

*Primary Examiner* — Bayan Salone

(57) ABSTRACT

This invention is a fastener. The fastener has a body, a clamper and a restraint. The body is provided with a coupling part, which comprises a discontinuous raised rib going around an outer surface of the coupling part; the clamper is fitted over the coupling part; a recess going around an inner surface of the clamper; the raised rib is fitted to the recess; the restraint is arranged to surround the clamper, so the restraint is capable of restricting the clamper in a certain position range of the body.

10 Claims, 2 Drawing Sheets

Direction A

FASTENER

CROSS-REFERENCE TO RELATED APPLICATIONS

This application is a continuation in part of International Patent Application No. PCT/CN2019/000015 with a filing date of Jan. 23, 2019, designating the United States, and further claims priority to Chinese Patent Application No. 201810108755.1 with a filing date of Jan. 25, 2018. The content of the aforementioned applications, including any intervening amendments thereto, are incorporated herein by reference.

TECHNICAL FIELD

The present disclosure relates to the technical field of fastener, especially to a fastener.

BACKGROUND

Among the commonly used fasteners, a preload is applied to the threaded fastener, the nuts and bolts (or stud, screw) will generate a relative angular displacement with the axis of the helix on the bolt, caused by various reasons such as displacement, creepage, vibration, impact of external force, etc. between the fastener and the fastened objects. The relative angular displacement of the screw pair will produce axial displacement at the same time, resulting in loosening of the threaded fastener and a reduction in the preload of the fastened objects.

SUMMARY OF THIS INVENTION

The present disclosure aims to provide a fastener system to address the problem of corresponding axial displacement of the relative angular displacement of the screw pair in some threaded fastener systems.

The fastener comprises a body, a clamper and a restraint. The body is provided with a coupling part, which comprises a plurality of discontinuous raised ribs going around an outer surface of the coupling part. The clamper is fitted over the coupling part. A plurality of grooves go around an inner surface of the clamper. The plurality of raised ribs are fitted to the grooves. The restraint is arranged to surround the clamper, so the restraint may restrict the clamper in a proper certain position range of the body.

In some embodiment, the fastener further comprises a supporting part. The supporting part is arranged adjacent to the body. A first end of the supporting part is abutted against to the fastened object, and a second end of the supporting part, which is opposite to the first end, is abutted against to the clamper.

In some embodiment, the clamper comprises at least two clamping parts. The plurality of groove is consisted of a plurality of annular recess on the at least two clamping parts. The annular recesses are discontinuous.

In some embodiment, the clamper is consisted of two symmetrical clamping parts.

In some embodiment, a cross section of the raised rib is semicircle-shaped, triangular, rectangular, trapezoidal, or jagged.

In some embodiment, the body comprises a head. At least one side of the head is provided with the coupling part. A horizontal width of the head is greater than the one of the body.

In some embodiment, the head and the body are integrated in one piece, wherein the head is located at one end of the body. The body and the head both are cylindrical. A diameter of the head is greater than the one of the body.

In some embodiment, the fastener further comprises a supporting part. The supporting part is arranged adjacent to the body. A first end of the supporting part is abutted against to the fastened object, and a second end of the supporting part, which is opposite to the first end, is abutted against to the clamper or the head.

In some embodiments, the clamper is cylindrical, the restraint is ring-shaped, and the restraint is fitted over the clamper.

In some embodiments, the coupling part is cylindrical or conical.

The present disclosure provides the following advantages:

The axial displacement is restricted when a relative angular displacement is generated during the clamper around the central axis.

Figure 1:
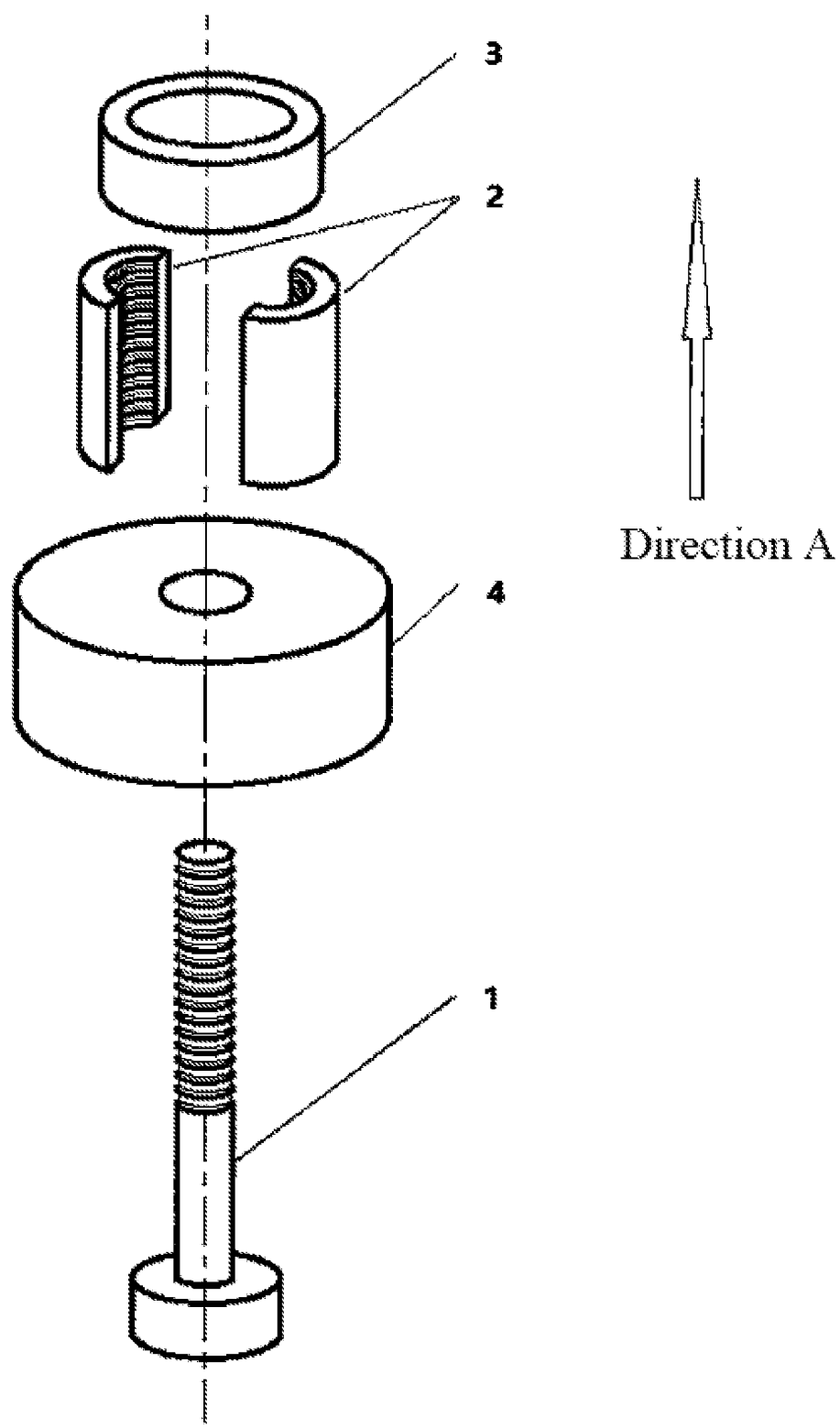
FIG. 1 is a schematic diagram of the fastener (in the example of a bolt)

IN the drawings: 1. bolt; 2. clamper; 3. Restraint; 4. supporting part; 5. first fastened object; 6. second fastened object.

DETAILED DESCRIPTION OF THE DISCLOSURE

The following describes the embodiments of the present disclosure in detail with reference to the accompanying drawings, so that the advantages and features of the present disclosure can be more easily understood by those skilled in the art, and the protection scope of the present disclosure is more clearly defined.

Embodiment 1

Figure 2:
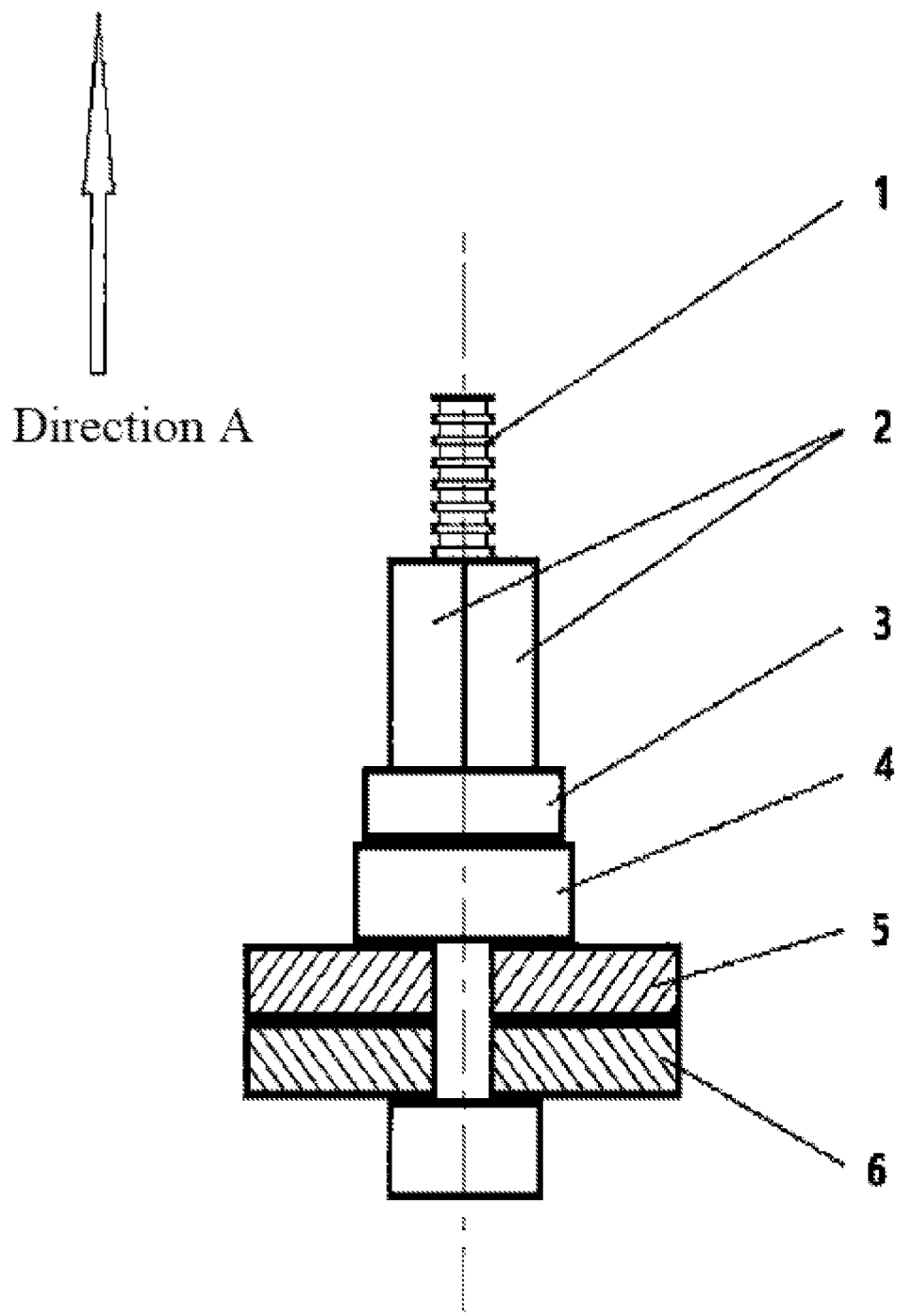
FIG. 2 is a schematic diagram showing the installation of the fastener (in the example of the bolt)

Please refer to FIG. 1 and FIG. 2, the present disclosure provides a fastener, which comprises a bolt 1, a clamper 2, a restraint 3, and a supporting part 4. The bolt 1 comprises a body 11.

In the embodiment, the body 11 is cylindrical. A first end of the body comprises a coupling part, and a second end of the body comprise a head which is cylindrical. The diameter of the head is greater than the diameter of the body. The body 11 with a head 12 defines the bolt 1. The body 11 and the head 12 may be integrated into one piece, or may be secured together by melt.

The coupling part comprises a plurality of discontinuous raised ribs going around an outer surface of the coupling part. A center axis of the raised rib 131 overlaps the enter axis of the body 11. The raised rib 131 is also known as external annular line. In the present disclosure, a cross section of the raised rib is semicircle. In some other embodiments, the cross section of the raised rib 131 may be triangular, rectangular, trapezoidal, or jagged.

The clamper 2 is fitted over the coupling part 13. A groove 23 going around an inner surface of the clamper 2. The groove 23 is also known as the internal annular line. The raised rib 131 is fitted to the groove 23. The clamper 2 comprises at least two clamping parts 21, 22. In the embodiment, the clamper 2 is consisted of two clamping parts 21, 22. A cross section of the groove 23 is semicircle. In some other embodiments, the cross section of the groove 23 may be in the form of other shapes, which may depend on the shape of cross section of the raised rib 131 as long as the groove 23 is fitted to the raised rib 131.

The restraint 3 is arranged to surround the clamper 2, so the restraint 3 may restrict the clamper 2 in a proper certain position range of the body 11. In the embodiment, the restraint 3 is ring-shaped, which fitted over the clamper 2. In some other embodiments, the restraint 3 is a clamping hoop. The clamping hoop may restrict the clamper 2 by means of bolt. Other members which can restrict the clamper 2 may be used.

In the present disclosure, the raised rib 131 is provided on the coupling part 13 of the body 11. The adjacent two raised ribs are spaced axially rather than arranged continuously. The axial movement of the clamper 2 is limited, so the supporting part 4 is provided for compensating the gap between the clamper 2 and the fastened object 5. The supporting 4 at the same time may transmit a preload that the clamper 2 applied to the fastened object 4. When the first end of the fastened object is abutted against the head 12, and the second end of the fastened object remains a distance to the clamper 2 while the clamper 2 cannot move axially anymore, the supporting part 4 may be arranged between the fastened object 5 and the clamper 2 so that the fastened object 5 will not move in range of the distance. The size of the supporting part 4 along the axis may be varied according to actual need, and may have deformation because of the preload of the clamper 2 so as to apply the preload from the clamper 2 onto the fastened object 5.

In the present disclosure, the supporting part 4 is a cylindrical part fitted over the body 11. The first end of the supporting part 4 is abutted against to the fastened object 5, while the second end of the supporting part 4 is abutted against to the clamper 2. In some other embodiments, the first end of the supporting part 4 is abutted against to the fastened object 5, while the second end of the supporting part 4 is abutted against to the head 12. In further embodiments, the supporting part 4 may be an individual part which forms no part of the present disclosure as long as it makes up the gap between the clamper 2 and the fastened object 5.

There are two manners to apply the preload onto the fastened object. In the example of the bolt, the two manners are described as follows:

1. An external stretching machine is used to apply the preload. As shown in FIG. 2, the first fastened object 5 and the second fastened object 6 are abutted against to one end of the head of the bolt 1. Step (1), locating the supporting part 4 against the fastened object; Step (2), applying a proper preload by the stretching machine to elongate the bolt; Step (3), mounting the clamper on bolt, and restricting it to the closest ring to the supporting part 4; Step (4), adjusting the structure combination within the supporting part 4, so that the size of the supporting part 4 along the axis is changed for making up the gap between the clamper and the first fastened object 5 until the supporting part 4 closely contact the clamper and the first fastened object 5 at the same time; Step (5), withdrawing the stretching machine so that the supporting part 4 bears the preload. The supporting part 4 may be deformed and therefore transmits the preload to the fastened object.

2. Applying force to the structure of the supporting part 4 so that the supporting part 4 generates a supporting force to the fastened object and the clamper. As shown in FIG. 2, the first fastened object 5 and the second fastened object 6 are abutted against to one end of the head of the bolt 1. Step (1), locating the supporting part 4 against the fastened object; Step (2), mounting the clamper on the bolt, and restricting it to the closest ring to the supporting part 4; Step (3), applying a force to the structure within the supporting part 4 so that the size of the structure within the supporting part 4 along the axis is changed to make up the gap between the clamper and the first fastened object 5 until the supporting part 4 closely contact the clamper and the first fastened object 5 at the same time; Step (4), continuously applying the force until the supporting force of the supporting part 4 to the clamper and the first fastened object 5 reaches an expected force. The supporting part 4 may be deformed and therefore transmits the preload to the fastened object.

In the embodiments, two fastened objects are shown. But as a matter of fact, the present disclosure may apply to fasten more than two objects with the clamper in proper size.

Embodiment 2

The difference between this embodiment and the embodiment 1 is that: both ends of the body of this embodiment comprise a coupling part which can fitted to the clamper. The clamper on one end of the body may be used as the head in the embodiment 1, and it can be used to preload objects according to the two manners described in the embodiment 1.

The above are only the embodiments of the present disclosure and do not limit the patent scope of the present disclosure. Any equivalent structure or equivalent transformation made by the description and drawings of the present disclosure, or directly or indirectly used in other related technical fields, shall be deemed within the scope of the present disclosure.

What is claimed is:

1. A fastener, comprising a body, a clamper and a restraint; wherein the body is provided with a coupling part, which comprises a plurality of discontinuous raised ribs going around an outer surface of the coupling part; the clamper is fitted over the coupling part; a plurality of grooves going around an inner surface of the clamper; the raised ribs are fitted to the grooves; the restraint is arranged to surround the clamper, so the restraint is capable of restricting the clamper in a certain position range of the body.

2. The fastener of claim 1, wherein the fastener further comprises one or more supporting parts; the supporting parts are arranged adjacent to the body; a first end of the supporting part is abutted against to the fastened object, and a second end of the supporting part, which is opposite to the first end, is abutted against to the clamper.

3. The fastener of claim 1, wherein the clamper comprises at least two clamping parts; the groove is consisted of a plurality of annular recesses on the at least two clamping parts.

4. The fastener of claim 3, wherein the clamper is consisted of two symmetrical clamping parts.

5. The fastener of claim 1, wherein a cross section of the raised rib is semicircle-shaped, triangular, rectangular, trapezoidal, or jagged.

6. The fastener of claim 1, wherein the body comprises a head; at least one side of the head is provided with the coupling part; a horizontal width of the head is greater than the one of the body.

7. The fastener of claim 6, wherein the head and the body are integrated in one piece, wherein the head is located at one end of the body; the body and the head both are cylindrical; a diameter of the head is greater than the one of the body.

8. The fastener of claim 6, wherein the fastener further comprises a number of supporting parts; the supporting parts are arranged adjacent to the body; the first end of the supporting part is abutted against to the fastened object, and the second end of the supporting part, which is opposite to the first end, is abutted against to the clamper or the head.

9. The fastener of claim 1, wherein the clamper is cylindrical, the restraint is ring-shaped, and the restraint is fitted over the clamper.

10. The fastener of claim 1, wherein the coupling part is cylindrical or conical.

* * * * *